United States Patent
Lee et al.

(10) Patent No.: US 8,514,943 B2
(45) Date of Patent: Aug. 20, 2013

(54) METHOD AND APPARATUS FOR ENHANCING PERFORMANCE OF ENTROPY CODING, VIDEO CODING METHOD AND APPARATUS USING THE METHOD

(75) Inventors: Bae-keun Lee, Bucheon-si (KR); Woo-jin Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1699 days.

(21) Appl. No.: 11/509,579

(22) Filed: Aug. 25, 2006

(65) Prior Publication Data

US 2007/0053426 A1 Mar. 8, 2007

Related U.S. Application Data

(60) Provisional application No. 60/713,746, filed on Sep. 6, 2005.

(30) Foreign Application Priority Data

Dec. 13, 2005 (KR) .......................... 10-2005-0122564

(51) Int. Cl.
*H04N 7/12* (2006.01)
(52) U.S. Cl.
USPC .................................. 375/240.23; 375/240.25
(58) Field of Classification Search
USPC .................. 375/240, 240.01, 240.02, 240.03, 375/240.23, 240.25; 382/239, 245, 232
See application file for complete search history.

(56) References Cited

U.S. PATENT DOCUMENTS

| | | | |
|---|---|---|---|
| 6,097,842 A | 8/2000 | Suzuki et al. | |
| 6,351,563 B1 | 2/2002 | Kim et al. | |
| 2003/0118243 A1* | 6/2003 | Sezer et al. | 382/245 |
| 2004/0017949 A1* | 1/2004 | Lin et al. | 382/232 |
| 2004/0066974 A1* | 4/2004 | Karczewicz et al. | 382/239 |

FOREIGN PATENT DOCUMENTS

| | | |
|---|---|---|
| JP | 2001-094982 A | 4/2001 |
| KR | 1999-016251 A | 3/1999 |

OTHER PUBLICATIONS

Ohm, J.R. et al., "Advances in Scalable Video Coding," Proceedings of the IEEE, vol. 93, No. 1, Jan. 2005, pp. 42-56.
Ridge, J., et al., "Variable length codes for SVC," JTV-P056,, 16th Meeting, PL, Jul. 24-29, 2005, pp. 1-4.
Japanese Office Action issued in Application No. 2008-528956; dated Feb. 22, 2011.
Woong Il Choi, et al.; "The report of CE 3 Improve coding efficiency of entropy coding"; Joint Video Team (JVT) of ISO/IEC MPEG & ITU-T VCEG {ISO/IEC JTC1/SC29/WG11 and ITU-T SG16 Q.6}; Apr. 2005; 11 pages total.
Woong Il Choi, et al; "CE03: CE report coding efficiency of entropy coding"; Joint Video Team (JVT) of ISO/IEC MPEG & ITU-T VCEG (ISO/IEC JTC1/SC29/WG11 and ITU-T SG 16 Q.6); Jul. 25-29, 2005; Poznan, PL; Points 2 and 3; XP030006105.

(Continued)

*Primary Examiner* — Allen Wong
(74) *Attorney, Agent, or Firm* — Sughrue Mion, PLLC

(57) ABSTRACT

An apparatus for enhancing the performance of entropy coding in a multilayer-based codec and an entropy coding method includes obtaining a distribution of a second coefficient included in an area of a base layer corresponding to the block, selecting a lookup table which is appropriate to the obtained distribution among a plurality of lookup tables, and transforming the first coefficient into a value mapped to the selected lookup table.

19 Claims, 6 Drawing Sheets

(56) References Cited

OTHER PUBLICATIONS

Bae-Keun Lee, et al; "VLC for FGS layer in 8×8 transform"; Joint Video Team (JVT) of ISO/IEC MPEG & ITU-T VCEG (ISO/IEC JTC1/SC29/WG11 and ITU-T SG 16 Q.6); Oct. 14-21, 2005; Poznan, PL; XP030006218.

Justin Ridge; "CE11: Variable length codes for SVC"; Joint Video Team (JVT) of ISO/IEC MPEG & ITU-T VCEG (ISO/IEC JTC1/SC29/WG11 and ITU-T SG 16 Q.6); Jul. 24-29, 2005; Poznan, PL; XP030006164.

"H.264/MPEG-4 Video Compression: Video Coding for Next-generation Multimedia."; Chapter 6, H.264/MPEG-4 Part 10, Iain E. G. Richardson; Oct. 17, 2003; Point 6.4.13.2; XP030001626.

European Search Report dated Feb. 20, 2012 issued in European Application No. 06798638.0.

\* cited by examiner

METHOD AND APPARATUS FOR ENHANCING PERFORMANCE OF ENTROPY CODING, VIDEO CODING METHOD AND APPARATUS USING THE METHOD

CROSS-REFERENCE TO RELATED APPLICATIONS

This application claims priority from Korean Patent Application No. 10-2005-0122564 filed on Dec. 13, 2005 in the Korean Intellectual Property Office, and U.S. Provisional Patent Application No. 60/713,746 filed on Sep. 6, 2005 in the United States Patent and Trademark Office, the disclosures of which are incorporated herein by reference in their entirety.

BACKGROUND OF THE INVENTION

1. Field of the Invention

Apparatuses and methods consistent with the present invention relate to a video compression technique and, more particularly, to a method and an apparatus for enhancing the performance of entropy coding in a multilayer-based codec.

2. Description of the Related Art

As information communication technology including the Internet develops, image communication increases. The existing text-based communication method does not satisfy consumer desire, so multimedia services, which may satisfy these desires, such as text, image, music and others, are increasing. Multimedia data requires mass storage media because of its large size, and a wide bandwidth for transmission. Therefore, a compression coding technique is essential for multimedia data transmission.

A basic principle of data compression is to remove redundancy. Data may be compressed by removing spatial redundancy such as a repetition of colors or objects, temporal redundancy such as the repetition of adjacent frames in a moving picture or a repetition of sounds in an audio file, or psychovisual redundancy considering the fact that the visual and perceptive abilities of human beings are insensitive to high frequencies. In a general video coding method, temporal redundancy is removed by temporal filtering based on motion compensation, and spatial redundancy is removed by a spatial transformation.

The result of removing redundancy is data loss. In the final step, a quantized result is coded without loss through entropy coding.

Currently, according to a draft of a scalable video coding (hereinafter called SVC) specification that is in progress in Joint Video Team (JVT), which is a group of video professionals of the International Organization for Standardization/International Electrotechnical Commission (ISO/IEC) and International Telecommunication Union (ITU), a multilayer-based coding technology based on H.264 has been proposed.

Entropy coding technologies currently used in the H.264 standard include Context-Adaptive Variable Length Coding (CAVLC), Context-Adaptive Binary Arithmetic Coding (CABAC), and others.

Table 1 shows the parameters that are encoded in each entropy coding technique in the H.264 standard.

TABLE 1

| PARAMETER TO BE CODED | Parameter Values | |
|---|---|---|
| | entropy_coding_mode = 0 | entropy_coding_mode = 1 |
| MACROBLOCK TYPE MACROBLOCK PATTERN QUANTIZATION PARAMETER REFERENCE FRAME INDEX MOTION VECTOR | Exp_Golomb | CABAC |
| RESIDUAL DATA | CAVLC | |

According to Table 1, if the entropy_coding_mode flag is 0, a macroblock type showing whether the macroblock is an inter-prediction mode or an intra-prediction mode, a macroblock pattern showing a form of a subblock that constitutes a macroblock, a quantization parameter, an index determining a quantization step, a reference frame index showing a number of a frame referred to in an inter-prediction mode, and a motion vector are coded by Exp_Golomb. And residual data showing a difference between an original image and a prediction image is coded by CAVLC.

On the other hand, if the entropy_coding_mode flag is 1, all the parameters will be coded by CABAC.

CABAC shows good performance with parameters having high complexity. Therefore, entropy coding based on Variable Length Coding (VLC), such as CAVLC, is set as a basic profile.

"Variable length code for SVC" (JVT-P056, Poznan, 16th JVT meeting; hereinafter, called JVT-P056), a document submitted by J. Ridge and M. Karczewicz in the 16th JVT meeting, presents a CAVLC technique that considers characteristics of SVC. JVT-P056 follows the same procedure as the existing H.264 in a discrete layer, but uses a VLC technique according to separate statistical characteristics in a Fine Granular Scalable (FGS) layer.

Currently, in the Joint Scalable Video Model (JSVM), three scanning passes are supported for FGS encoding. The three passes are a significant pass, a refinement pass and a remainder pass. For each scanning pass, different methods are applied according to statistical characteristics. For example, in a refinement pass, one VLC table, which is acquired based on the fact that zero ("0") is preferred in entropy coding, is used.

The JVT-P056 presents a VLC technique for an FGS layer. The technique uses an existing CAVLC technique in a discrete layer, but uses a separate technique using statistical characteristics of the FGS layer.

JVT-P056 suggests a technique for the significant pass as follows. A codeword is characterized by "m", a cut-off parameter. If "C", a symbol to be coded, does not exceed m, the symbol is encoded using Exp_Golomb code. If the symbol C is bigger than m, it is divided into the two parts of a length and a suffix according to Formula 1, and is encoded.

$$P = \left\lfloor \frac{C-m}{3} \right\rfloor + m \tag{1}$$

"P" is an encoded codeword, and consists of a length and a suffix (00, 10, or 10).

Because there is a high possibility that zero ("0") will be generated in the refinement pass, JVT-P056 presents a way to allocate a codeword having a different length by using one VLC table based on the number of zeros which are included in each refinement bit group. The refinement bit group contains refinement bits in groups of a predetermined number. For example, four refinement bits may be considered as one refinement bit group.

Because the current SVC draft has extended a single layer coding algorithm of the conventional H.264 to a multilayer coding algorithm, there is some overhead in the coding of each layer.

However, in the current SVC draft, like the conventional H.264, a method that refers to characteristics of surrounding blocks of the same layer is used. But in the case of a video consisting of multilayers, characteristics of blocks of lower layers corresponding to the blocks of the current layer may additionally be used. Therefore, a method using characteristics of lower layers at the time of SVC-based entropy coding needs to be designed.

In JVT-P056, a technique using one fixed VLC table when coding refinement bits in the refinement pass is presented. But, when considering that there are different zero ("0") distributions for different frames, slices, macroblocks, or transformation blocks (blocks generated after the discrete cosine transformation (DCT)), one VLC table is not enough.

FIG. 1 shows the rate of bits that are not zeros in FGS layers in a case where a single VLC table is used in a refinement pass. Referring to FIG. 1, as the number of FGS layers increases, the number of non-zeros among blocks to be coded increases to a maximum of 15% (zeros decrease by a maximum 15%). Hence, even though a single VLC table, which is assumed to have a high number of zeross, is efficiently used in the first FGS layer, it is not guaranteed to be efficient in the upper FGS layer. Rather, it would be more efficient to use different VLC tables for each FGS layer. Therefore, there is a need for a technique that uses different tables for each FGS layer in a refinement pass.

SUMMARY OF THE INVENTION

The present invention provides a method and an apparatus for enhancing performance of entropy coding by using interlayer correlation between layers in a multilayer-based codec.

Also, the present invention provides a method and an apparatus for enhancing performance of entropy coding by selecting VLC tables according to characteristics of each FGS layer in a refinement pass.

According to an aspect of the present invention, there is provided an entropy coding method that codes a first coefficient included in a block of a predetermined layer among coefficients generated by coding a multilayer video without loss, where the entropy coding method may include (a) obtaining a distribution of a second coefficient included in an area of a base layer corresponding to the block, (b) selecting a lookup table which is appropriate to the obtained distribution among a plurality of lookup tables, and (c) transforming the first coefficient into a value mapped to the selected lookup table.

According to another aspect of the present invention, there is provided an entropy decoding method that restores a first coefficient on the block of the layer by decoding a first bitstream of a predetermined layer among input bitstreams without loss, where the entropy decoding method may include (a) restoring a second coefficient included in an area of a base layer corresponding to the block, (b) obtaining a distribution of the restored second coefficient, (c) selecting a lookup table which is appropriate to the obtained distribution among a plurality of lookup tables, and (d) transforming the first bitstream into the first coefficient based on the selected lookup table.

According to still another aspect of the present invention, there is provided a variable length decoding method that codes a first coefficient of the FGS (Fine Granular Scalable) layer among coefficients consisting of one discrete layer and at least one or more FGS layers without loss, where the variable length decoding method may include (a) grouping an absolute value of the first coefficient in units of predetermined numbers, (b) producing the rate of zeros among the second coefficients included in a predetermined unit area to which the first coefficient belongs, (c) selecting one among a plurality of variable length coding (VLC) tables depending on whether the rate exceeds a predetermined threshold, and (d) transforming the absolute value of the grouped first coefficient into a corresponding codeword by referring to the selected VLC table.

According to still another aspect of the present invention, there is provided a variable length decoding method that restores a first coefficient of the FGS layer by decoding a first bitstream of an FGS layer among the input bitstreams without loss, the variable length decoding method may include (a) producing the rate of zeros among the restored second coefficients included in a predetermined unit area to which the first coefficient belongs, (b) selecting one among a plurality of VLC tables depending on whether the rate exceeds a predetermined threshold, and (c) restoring the first coefficient corresponding to a predetermined codeword on the selected VLC table among the first bitstream.

According to still another aspect of the present invention, there is provided a variable length decoding method that restores a refinement coefficient of the FGS layer by decoding a first bitstream of an FGS layer among the input bitstreams without loss, where the variable length decoding method may include (a) reading a token of a VLC table inserted by predetermined unit areas in the first bitstream, (b) loading a VLC table corresponding to the token, and (c) restoring the first coefficient corresponding to a predetermined codeword on the loaded VLC table among the first bitstream.

According to still another aspect of the present invention, there is provided an entropy decoding apparatus for restoring a first coefficient on a block of the layer by decoding a first bitstream of a predetermined layer among the input bitstream without loss, where the entropy decoding apparatus may include a unit restoring a second coefficient included in an area of a base layer corresponding to the block; a unit obtaining a distribution of the restored second coefficient; a unit selecting a lookup table which is appropriate for the obtained distribution among a plurality of lookup tables; and a unit transforming the first bitstream into the first coefficient based on the selected lookup table.

According to still another aspect of the present invention, there is provided a variable length decoding apparatus for restoring a first coefficient of the FGS layer by decoding a first bitstream of a FGS layer among the input bitstream without loss, where the variable length decoding apparatus may include a unit producing the rate of zeros among the restored second coefficients included in predetermined unit areas to which the first coefficient belongs; a unit selecting one among a plurality of VLC tables depending on whether the rate exceeds a predetermined threshold; and a unit restoring the first coefficient corresponding to a predetermined codeword on the selected VLC table among the first bitstream.

According to still another aspect of the present invention, there is provided a variable length decoding apparatus for restoring refinement coefficients of the FGS layer by decoding a first bitstream of an FGS layer among the input bitstream without loss, the variable length decoding apparatus including a unit reading a token of a VLC table inserted by predetermined unit areas in the first bitstream; a unit loading a VLC table corresponding to the token; and a unit restoring the first coefficient corresponding to a predetermined codeword of the loaded VLC table among the first bitstream.

BRIEF DESCRIPTION OF THE DRAWINGS

The above and/or other aspects of the present invention will become more apparent by describing in detail exemplary embodiments thereof with reference to the attached drawings in which.

DETAILED DESCRIPTION OF EXEMPLARY EMBODIMENTS

Figure 1:
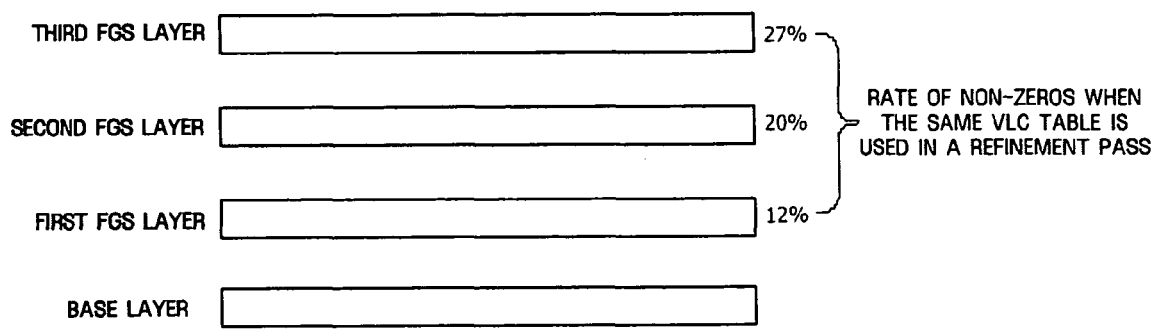
FIG. 1 illustrates a rate of non-zero coefficients of FGS layers when a single VLC table is used.

The present invention and methods of accomplishing the same may be understood more readily by referring to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

In order to improve the performance of entropy coding, the present invention presents two techniques. One is an extended CAVLC technique using the correlation between layers (hereinafter called "extended CAVLC"), and another is a technique that improves the performance of entropy coding by using VLC tables adapted to the FGS layer.

Extended CAVLC Technique

Currently, the SVC draft provides two inter-layer prediction techniques. One is an intra-base mode, and another is a residual prediction mode. The intra-base mode is a method that sets an image of a basic layer corresponding to a block of the current layer as a prediction signal, thereby improving the coding efficiency by differentiating the current layer block and the prediction signal. Hereinafter, the term "block" signifies a transform unit in spatial transform (e.g., a 4×4 or 8×8 grid of pixels). The residual prediction mode is a method that additionally improves the coding efficiency by obtaining the difference between base residual signals that are generated through inter-prediction of a base layer.

Figure 2:
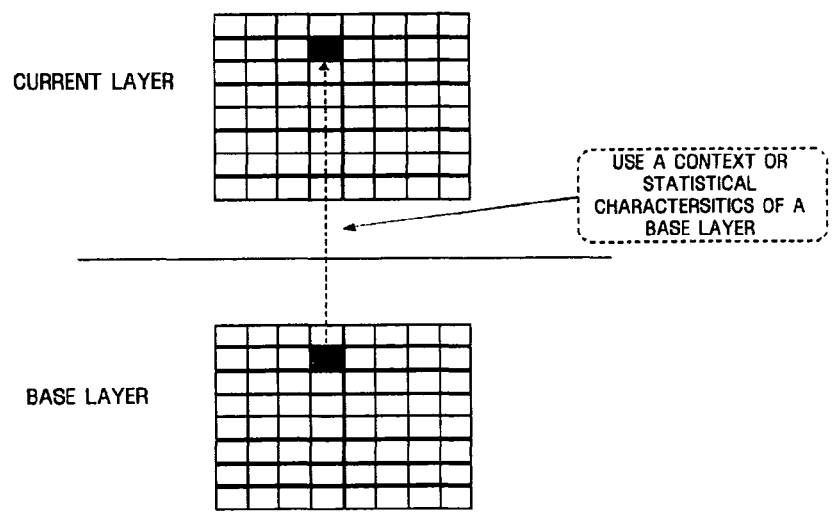
FIG. 2 illustrates the concept of entropy coding the current layer by using characteristics of a basic layer.

Likewise, the prediction signal or the base residual signal provides more effective information than other blocks of the current layer or other residual signals of the current layer. Therefore, it may be desirable to utilize characteristics of base layers in selecting a look-up table, as shown FIG. 2.

The SVC draft allows the intra-base mode and the residual prediction mode to be used. In other words, if an Intra_base_mode flag is 1, it indicates that the intra-base mode is used, and if a Res_pred_flag is 1, it indicates that the residual prediction mode is used. If each flag is 0, it indicates that the concerned mode is not used. Therefore, in order to use the extended CAVLC technique presented in the present invention, at least one of the flags should be 1.

Figure 3:
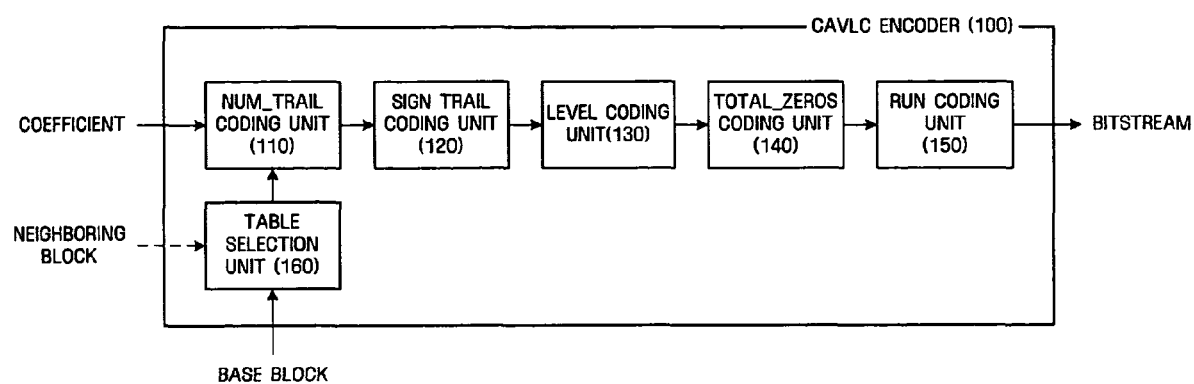
FIG. 3 is a block diagram illustrating the structure of CAVLC according to an extended CALVC technique.

FIG. 3 is a block diagram illustrating the structure of CAVLC according to an extended CALVC technique. FIG. 3 is similar to the CAVLC encoder used in the existing H.264, but is different in that it may only use characteristics of base blocks when selecting a look-up table, and may combine characteristics of neighboring blocks and base blocks, and a Num_Trail coding unit 110 may store the number of coefficients (TotalCoeffs) and TrailingOnes by referring to the selected reference table.

Figure 4:
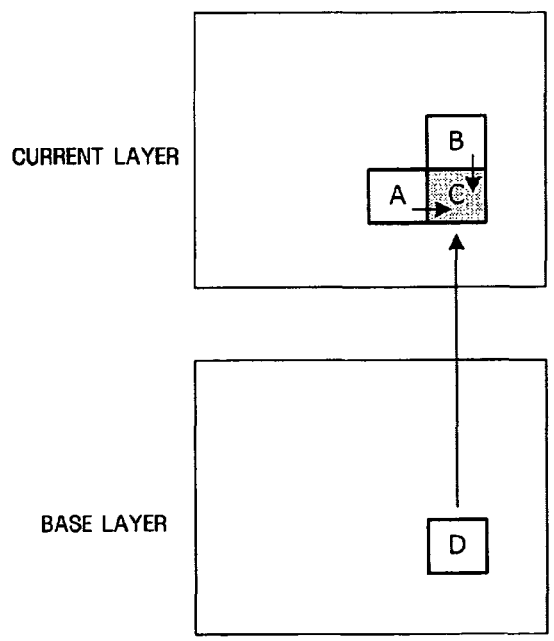
FIG. 4 illustrates the concept of referring to neighboring blocks and blocks of a base layer in the CAVLC encoding of blocks of the current layer.

FIG. 4 illustrates the concept of referring to neighboring blocks A and B of block C, and blocks of a base layer corresponding to the block D (hereinafter, called a base block) in CAVLC encoding of block C of the current layer. For example, in FIG. 4, a base layer may be a discrete layer having the QCIF resolution, and the current layer may be a discrete layer having the CIF resolution. Because there is little correlation between a discrete layer and an FGS layer or between FGS layers, it would be difficult to apply the concept.

First, referring to a case that selects a look-up table only using information of a base block, a reference table selection unit 160 may count non-zero coefficients among coefficients included in the base block D. A look-up table may be selected according to the count (see Table 2).

TABLE 2

Count - Lookup Table Correlations

| Count | Selected lookup table |
| --- | --- |
| 0, 1 | Table 1 |
| 2, 3 | Table 2 |
| 4, 5, 6, 7 | Table 3 |
| 8 or more | Table 4 |

Table 1 may be a table for allocating shorts codes to TotalCoeffs of small values and allocating long codes to TotalCoeffs of big values. Table 2 may be biased to the side of coefficients having intermediate numbers (relatively short codes are allocated to TotalCoeff values around 2 to 4). Table 3 may be biased to the side of coefficients having high numbers, and Table 4 may allocate fixed 6-bit codes to all TotalCoeff and TrailingOnes values.

Next, considering a case that selects a look-up table by combining the information of neighboring blocks (A, B) and base blocks (D), a reference table selection unit 160 may select a look-up table by combining non-zero counts (nA, nB)

of neighboring blocks A and B and counts (nD) of non-zero coefficients of base blocks. For example, the counts (nD) may be obtained by the following equation 2.

$$nD = \text{round}(w_1 \times nA + w_2 \times nB + w_3 \times nC) \quad (2)$$

In equation 2, $w_1$, $w_2$, and $w_3$ are weights, respectively, and they sum to 1. The weights may be all ⅓, or the weight of a base block may be set to a larger value. Or, the weights may be set as values making a commonly-used Rate-Distortion (R-D) cost function a minimum.

Of course, depending on the order of coding, only one neighboring block may exist, or no neighboring block may exist. Formula 2 shows a weighted average as an example of calculating representative values from a plurality of data.

The table selection unit 160 may select one among at least 4 look-up tables by applying the nD calculated by equation 2 to Table 2.

Referring to FIG. 3, Num_Trail coding unit (110) may code non-zero coefficients (TotalCoeff) and TrailingOnes based on look-up tables selected by the table selection unit 160. The Trailing Ones refer to the coefficients that are 1 or −1.

Operation processes in a Sign_Trail coding unit 120, a Level coding unit 130, a Total_zeros coding unit 140, and a Run coding unit 15 after the Num_Trail coding unit 110 may be the same as those of the conventional H.264, and are therefore explained briefly.

The Sign_Trail coding unit 120 may code symbols of TrailingOnes as a single bit (0 signifies +, and 1 signifies −) in a reverse order (relative to the scanning order). The level coding unit 130 may code levels (sizes) of remaining coefficients except the TrailingOnes. The Total_zeros coding unit 140 may code the number of total zeros (TotalZeros) before the last coefficient among the non-zero coefficients. Finally, the run coding unit 15 may code the number of zeros existing in between the non-zero coefficients. In this way, a CAVLC-coded bitstream may be output. Because the selected look-up table may be selected by passing the same process in the CAVLC decoding process, the information may not have to be included in the bitstream.

Figure 5:
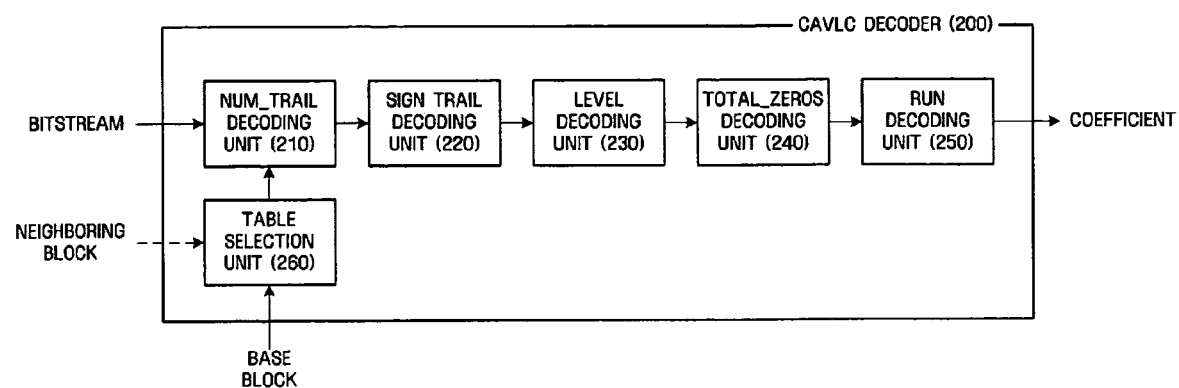
FIG. 5 illustrates the structure of a CAVLC decoder corresponding to the CAVLC encoder of the FIG. 3.

The decoding process of coefficients (quantization coefficients) may follow the same order as the process of the encoder 100. But, in each step, decoding may be performed in reverse relative to the coding technique. FIG. 5 is a block diagram illustrating the structure of a CAVLC decoder corresponding to the CAVLC encoder of FIG. 3.

A table selection unit 260 may use characteristics of coefficients of base blocks, or may combine characteristics of coefficients of base blocks and coefficients of neighboring blocks, and then may select one among a plurality of look-up tables, thereby providing the selected look-up table to a Num_Trail decoding unit 210. As in the video encoding process, because the upper layer (the current layer) may be restored after the base layer is restored, a look-up table selected in the table selection unit 260 and a look-up table selected in the table selection unit (160 of FIG. 3) may be the same.

The Num_Trail decoding unit 210 may restore TotalCoeffs and TrailingOnes from bits which are same with the items of the look-up table from the first of the input bitstream, based on the provided look-up table. Then, the Sign_Trail decoding unit 220 may restore the symbols of the TrailingOnes by reading bits sequentially. A level decoding unit 230 may read codes on levels included in the bitstream, and may restore levels (sizes) of coefficients except the TrailingOnes among non-zero coefficients. A Total_Zeros decoding unit 240 may read codes corresponding to TotalZeros, and may restore the TotalZeros (the number of non-zero coefficients). Finally, a run decoding unit 250 may read remaining bitstreams among the input bitstreams, and may insert as many zeros as the number of runs in between the non-zero coefficients. The total number of the inserted 0s should be same as TotalZeros. In this way, coefficients before the CAVLC coding are restored.

Adaptive VLC Technique by Layers

JVT-P056 presents a technique of applying VLC instead of CABAC in the entropy coding of FGS layers. Here one VLC table is used, considering a characteristic that there is a greater possibility that zeros may be generated in a refinement pass of FGS layers. Generally, among a plurality of FGS layers, the number of zeros increases in upper layers, and even in the same FGS layer, the distribution of zeros is not the same in frames, slices, macroblocks or blocks. Therefore, it is difficult to choose an optimal VLC table. Rather, a technique is required that may adaptively select one table among a plurality of VLC tables.

Exemplary embodiments of the present invention make it possible for different VLC tables to be selected based on the number of zeros included in a unit area (a frame, a slice, a macroblock, or a block).

Figure 6:
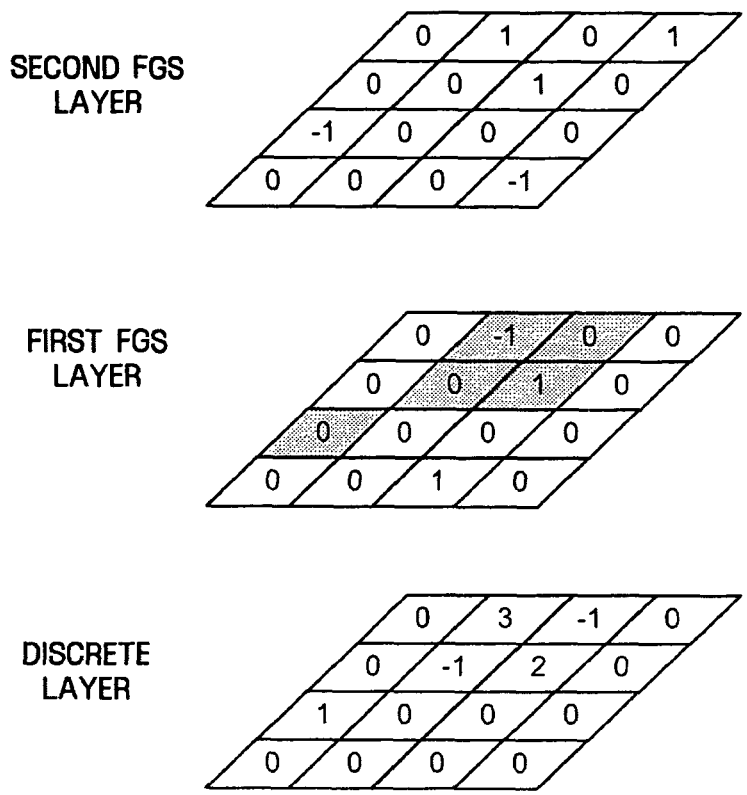
FIG. 6 illustrates an example where quantization coefficients are indicated separately as one or more discrete layers and at least one FGS layer.

FIG. 6 illustrates an example where quantization coefficients are indicated separately as one or more discrete layers and at least one FGS layer according to an FGS scheme. Each layer is indicated by blocks consisting of coefficients of 4×4 units. Numbers in the same location are used to express one quantization coefficient. The FGS scheme is used to support scalability in terms of bit rate, and a variable bit rate may be implemented by truncating upper layer. Of course, it's also possible that a few numbers in some layers are truncated.

For example, coefficients located in the second row of the first line in a 4×4 block are 3, −1, and 1. In order to restore quantization coefficients corresponding to this location, all these coefficients are necessary, but depending on the situation, 1, or 1 and −1 may be truncated, and in a decoder step, the quantization coefficients may be restored only by low-layer coefficients which are relatively important (of course, a loss is generated).

The FSG layers are very different from discrete layers in terms of characteristics. This is because while the discrete layers roughly express round images, the FGS layers are composed of values having a difference concept. Also, while other values except 0, 1, and −1 may appear in the discrete layers, 0, 1, and −1 are common in the FGS layers.

As described above, when coding FGS layers, processes may be divided into a significant pass and a refinement pass, thereby applying different entropy coding techniques. When the coefficient of a discrete layer corresponding to a coefficient of a FGS layer is 0, the coefficient layer of the FGS layer is may be coded by a significant pass. And when the coefficient of a discrete layer corresponding to a coefficient of a FGS layer is not 0, the coefficient of the FGS layer is may be coded by a refinement pass. In case of a first FGS layer, a coefficient (i.e., a refinement coefficient), which is coded by a refinement pass, may be indicated by a shadow. An adaptive VLC technique by layers according to exemplary embodiments of the present invention may be especially suitable for being applied to the refinement pass. When coefficients of a discrete layer are coded by VLC, it may be desirable to code considering level, run, and other parameters as shown in FIG. 3. However, in the case of refinement coefficients, because coding of level, TrailingOnes, and other parameters is not necessary, a separate VLC coding scheme may be required.

Figure 7:
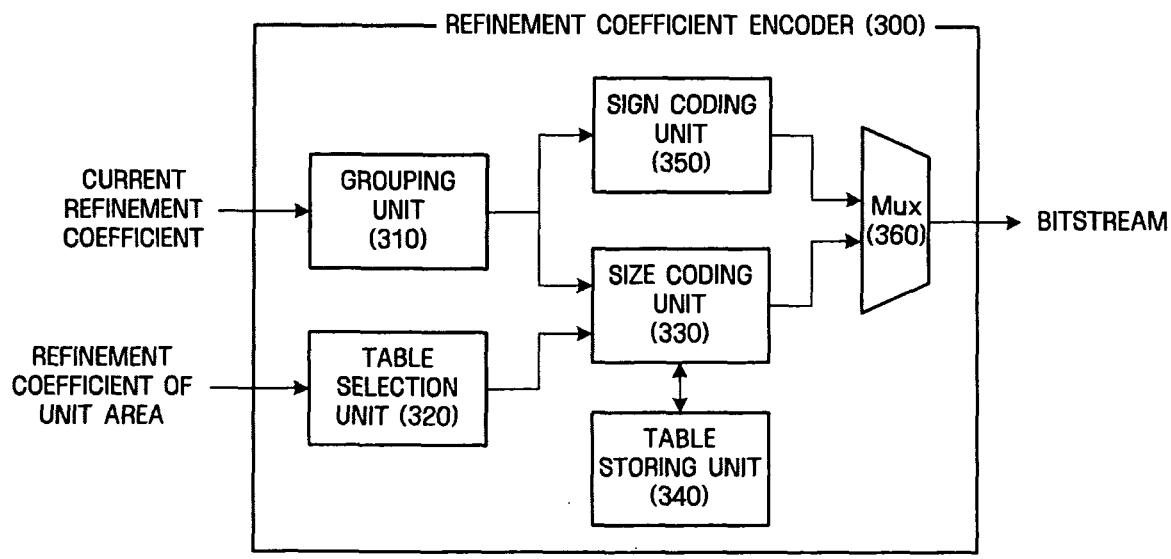
FIG. 7 is a block diagram illustrating the structure of a refinement coefficient encoder according to an exemplary embodiment of the present invention.

FIG. 7 is a block diagram illustrating the structure of a refinement coefficient encoder 300 according to an exemplary embodiment of the present invention.

Currently, refinement coefficients may be input to a grouping unit 310. The grouping unit 310 may group the input refinement coefficients by a predetermined number, for example, by 4 numbers, then may provide the absolute value (size: consists of 1 or 0) to a size coding unit 330, and may provide the sign (sign: a sign of the refinement coefficient except 0) to a sign coding unit 330.

A VLC table for using in the size coding unit 330 may be selected by referring to refinement coefficients of the coded unit area (including a frame, a slice, a macroblock, or a block). The unit area may be a frame, a slice, a macroblock, or a block to which the current refinement coefficient belongs. For example, if a table is selected by frame units, the number of candidate tables decreases, but it is disadvantageous in terms of adaptivity of table selection. If a table is selected by block units, it will have a high adaptivity, but the number of candidate tables for selection increases. Therefore, it is desirable that a user selects a unit area by considering the use, the purpose, and other parameters.

Once a unit area to which the current refinement coefficient belongs is determined, a table selection unit 320 may count the number of zeros among bits belonging to the unit area. Then, if the rate occupied by zeros among the bits exceeds a predetermined threshold (a first threshold), a table biased to zero (e.g., the table of JVT-P056) may be selected, otherwise a table relatively less biases to zero may be selected. Here, two or more VLC tables may be used. If a table is selected among two VLC tables (expressed as switching), only one threshold may be necessary, and as the number of VLC table increases, a second threshold, a third threshold, and others may additionally be necessary. The thresholds may be values that may be determined empirically or experimentally, for example, they may be ⅞, ¾, ⅔, ½, and others.

For example, if two VLC tables are used, and a first threshold is set to ⅔, the VLC tables of Table 3 and Table 4 may be used. If the number of zeros of the unit area exceeds ⅔, VLC table of Table 3, which is biased to zero, may be used. Also, if the number of zeros is less than ⅔, the VLC table of Table 4, which is less biased to zero, may be used. "Symbol" in FIG. 3 and FIG. 4 refers to a size value of a refinement coefficient row which is grouped by 4s, and "codeword" refers to the result of coding of the symbol.

TABLE 3

VLC Table Biased to Zero

| SYMBOL | CODEWORD |
| --- | --- |
| 0000 | 00 |
| 0001 | 010 |
| 0010 | 011 |
| 0011 | 11000 |
| 0100 | 100 |
| 0101 | 11001 |
| 0110 | 11010 |
| 0111 | 111100 |
| 1000 | 101 |
| 1001 | 11011 |
| 1010 | 11100 |
| 1011 | 111101 |
| 1100 | 11101 |
| 1101 | 111110 |
| 1110 | 1111110 |
| 1111 | 1111111 |

TABLE 4

VLC Table Less Biased to Zero

| SYMBOL | CODEWORD |
| --- | --- |
| 0000 | 11000 |
| 0001 | 11001 |
| 0010 | 11010 |
| 0011 | 00 |
| 0100 | 11011 |
| 0101 | 010 |
| 0110 | 011 |
| 0111 | 111100 |
| 1000 | 11100 |
| 1001 | 100 |
| 1010 | 101 |
| 1011 | 111101 |
| 1100 | 11101 |
| 1101 | 111110 |
| 1110 | 1111110 |
| 1111 | 1111111 |

The VLC table of Table 3 is the same as the VLC table presented in JVT-P056. However, in Table 4, considering the decrease of the number of zeros, a VLC table, which is different from Table 3, is illustrated. The VLC table of Table 4 gives the shortest codeword in the case where two of the 4 bits of a symbol are 1, and gives the second shortest codeword in the case where two of the 4 bits are 1 and all 4 bits are 0. Therefore, if the VLC table of Table 4 is applied to cases where there are many ones in the refinement coefficients (especially, in high FGS layers), the size of generated codes may be reduced. It is of course possible to express characteristics of refinement coefficients in more detail by using a greater number of threads and VLC tables.

Referring to FIG. 7, a token on a VLC table, which may be selected by the table selection unit 320, may be provided to the size selection unit 330. The token refers to an index corresponding to each VLC table. The size coding unit may read the VLC table corresponding to the provided token from the table storing unit 340. The table storing unit may be implemented in the form of a nonvolatile memory device such as a ROM, PROM, EPROM, EEPROM, a flash memory, or a storage media such as a hard disk.

The size coding unit 330 may transform an absolute value (i.e., a symbol) of a predetermined number (i.e., 4) of refinement coefficients which may be provided from the grouping unit 310 into a codeword by referring to a VLC table corresponding to the token.

A sign coding unit 350 may code a sign which may be provided from the grouping unit 310 as a one bit sign code. Normally, the sign code is 0 in the case of a positive sign, and 1 in the case of a negative sign.

A Mux (i.e., a multiplexer) 360 may generate a bitstream by mixing a set of codewords which may be output from the size coding unit 330, and a set of sign codes which may be output from the sign coding unit 350.

For example, assume that a set of refinement coefficients to be coded is: −1, 0, 1, 1, 0, 0, 1, −1. The grouping unit 310 may group the set of refinement coefficients by 4s, and provide 1011 and 0011, the absolute values, to the size coding unit 330, and the signs −+++− to the sign coding unit 350.

If the rate occupied by zeros among refinement coefficients of a unit area does not exceed ⅔, the predetermined threshold, the table selection unit 320 may deliver a token for the VLC table of Table 4 to the size coding unit 330. The size coding unit 330 may read a VLC table like that of Table 4 from the table storing unit 340, and may transform the provided 1011 and 0011 to a corresponding codeword. As a result of the transform, the value, which may be output from the size coding unit 330 and may be input to the Mux 360, is 11110100. Meanwhile, the sign coding unit 350 may transform the sign –+++– to 10001. It is possible to additionally apply a certain entropy coding method to the transformed 10001. Then, the Mux 360 may combine 11110100 and 10001, and output it.

Figure 8:
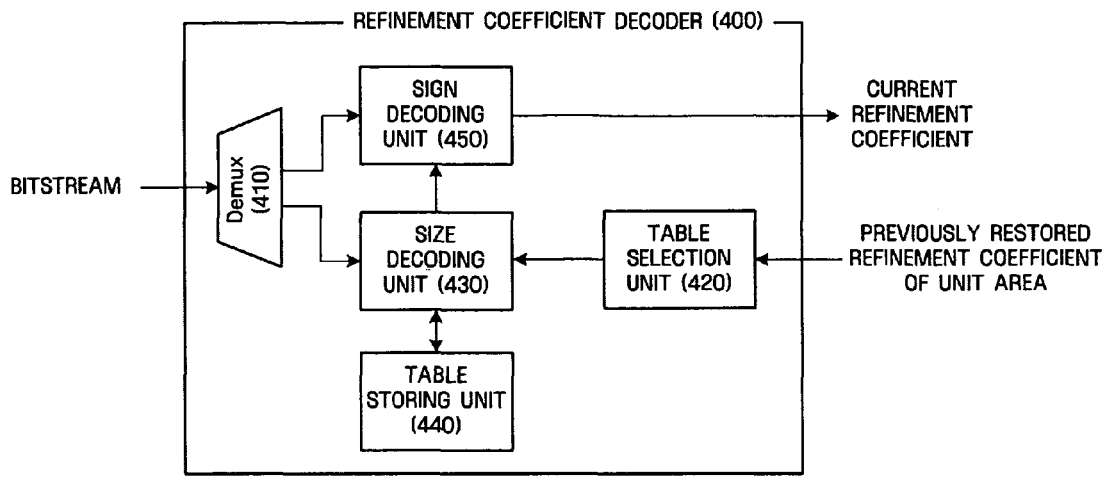
FIG. 8 is a block diagram illustrating the structure of a refinement coefficient decoder corresponding to the refinement coefficient encoder of FIG. 7.

FIG. 8 is a block diagram illustrating the structure of a refinement coefficient decoder corresponding to the refinement coefficient encoder 300 of FIG. 7. The input bitstream may be divided into a set of codewords and a set of sign codes through a Demux (i.e., a demultiplexer) 410. The set of codewords may be provided to a size decoding unit 430, and the set of sign codes to the sign decoding unit 450, respectively.

In the same way as that of the encoder 300, the table selection unit 420 may calculate the rate of zeros among refinement coefficients included in the restored unit area, and then may select one of the two VLC tables, depending on whether the rate exceeds the threshold. Of course, it is also possible to set a plurality of thresholds and to use three or more VLC tables.

A size decoding unit 430 may read the selected VLC table from a table storing unit 440, and then may additionally read bits constituting a set of codewords until the same value as the codeword of the VLC table appears. If a predetermined number of bits are the same as a certain codeword included in the selected VLC table, the codeword may be transformed into a symbol corresponding to the codeword.

The transformed symbol may be provided to a sign decoding unit 450. The sign decoding unit 450 may sequentially read sign codes provided from the Demux 410, and then may give signs corresponding to the sign codes to values which are not zero (i.e., 1) among symbols (consisting of 4 bits) which may be provided from the size decoding unit 430 in order. By this method current refinement coefficients may be restored from the bitstream.

For example, assume that a bitstream, which is input to the decoder 400, is 1111010010001. The Demux 410 may divide it into 11110100 and 10001, and may provide the former to the size decoding unit 430 and the latter to the sign decoding unit 450. The table selection unit may confirm that the refinement coefficient of the restored unit area does not reach ⅔, and may deliver a token of a VLC table of Table 4 to the size decoding unit 430.

As the size decoding unit 430 reads the 11110100 sequentially, it may check whether there is a same codeword among codewords of Table 4. Because there is no same codeword until 11110, it may check for the next 111101. Because this codeword exists in Table 4, the symbol 1011 corresponding to the codeword is restored. Therefore, the value, which may be output from the size decoding unit 430, and may be input to the sign decoding unit 450, is 10110011.

The sign decoding unit 450, after restoring –+++–, the signs corresponding to 10001, may assign the signs to the values that are not 0, among 10110011. As a result, a set of refinement coefficients: –1, 0, 1, 1, 0, 0, 1, which was input to the encoder, is restored.

Up to now, it has been explained that one of a plurality of candidate VLC tables may be selected in the refinement coefficient decoder, as in the encoder 300. But, because the FGS layer, when delivered to the decoder 400, is sent after some parts of the layer are truncated, in the case where the current block uses surrounding features within the unit area, a problem may occur where a VLC table is used which is not the same in the encoder and decoder, thereby generating a serious problem that the decoder cannot restore original coefficients.

Therefore, in another exemplary embodiment of the present invention, a token of a VLC table may be included in a bitstream, and may be delivered to the refinement coefficient decoder 400. The VLC table may be selected by unit areas, in other words, units of a frame, a slice, a macroblock, or a block unit. And if a VLC table is selected in minute units, because the overhead may be bigger when transported, it is desirable for the unit area to be a slice or a macroblock. In this case, the token may be included in a slice header or a macroblock header, and transported.

The refinement coefficient decoder 400, which received a bitstream in which the token is included, may take a VLC table corresponding to the token directly from the table storing unit 440, so the table selection unit 420 may be omitted.

Figure 9:
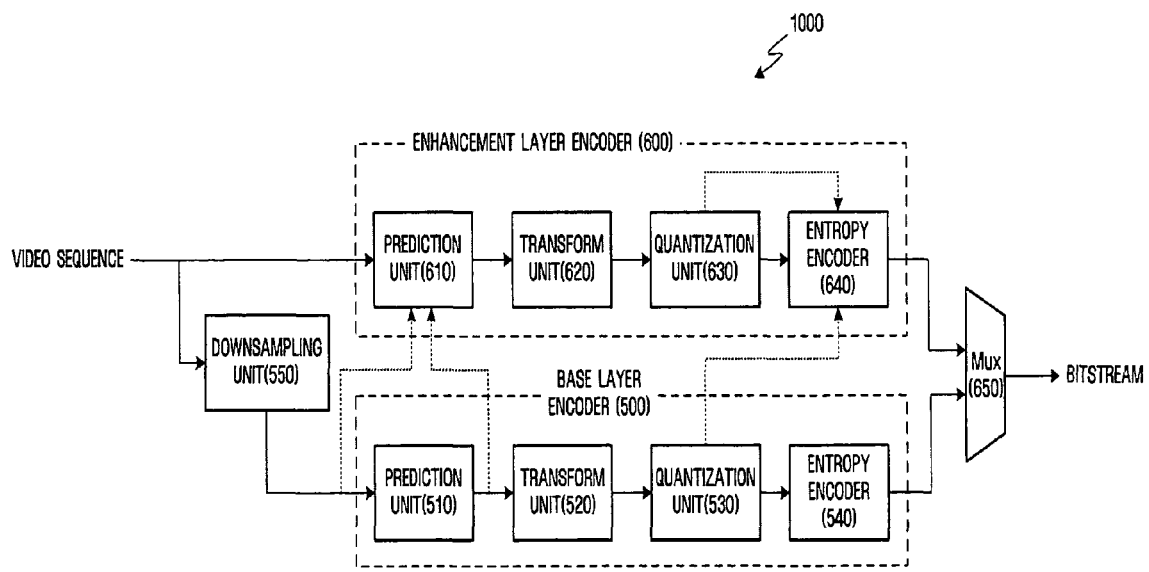
FIG. 9 is a block diagram illustrating the structure of a multilayer-based video encoder, which an entropy encoder may be applied to, as shown in FIG. 3 or FIG. 7.

FIG. 9 is a block diagram illustrating the structure of a multilayer-based video encoder 1000, in which an entropy encoder may be applied, as shown in FIG. 3 or FIG. 7.

An original video sequence may be input to a enhancement layer encoder 600, and a base layer encoder 500 after being downsampled by a downsampling unit 550 (only when there is a change in resolution between layers).

A prediction unit 610 may get residual signals by differentiating images predicted by a predetermined method in the current macroblock. The prediction methods may be a directional intra-prediction, an inter-prediction, intra-base prediction, and residual prediction.

A transform unit 620 may transform the obtained residual signals by using spatial transform techniques such as the DCT, wavelet transform, and others, thereby generating transform coefficients.

A quantization unit 630 may quantize the transform coefficients by predetermined quantization steps (as the quantization steps get bigger, the loss or the compression rate gets higher), thereby generating quantization coefficients.

Like in the case of the enhancement layer encoder 600, the base layer encoder may include a prediction unit 510, a transform unit 520, and a quantization unit 530 of same functions. But, the prediction unit 510 may not use an intra-base prediction or a residual prediction.

An entropy encoder 640 may output an enhancement layer bitstream by encoding the quantization coefficients without loss, and in the same manner, the entropy encoder 540 may output the base layer bitstream. A Mux 650 may generate bitstreams to be sent to an end of the video decoder by combining the enhancement layer bitstream and the base layer bitstream.

The entropy encoder 640 may include the CAVLC encoder 100 of FIG. 3 or the refinement coefficient encoder 300 of FIG. 7. If the entropy encoder 640 is the CAVLC encoder 100, a lookup table may be selected based on the number of nonzeros among quantization coefficients of a base block provided from the quantization unit 530, and a CAVLC encoding process such as Num_Trail coding, and others may be executed according to the selected lookup table.

In a case where the entropy encoder 640 may be operated as the refinement coefficient encoder 300, the base layer corresponds to a discrete layer, and the enhancement layer corresponds to an FGS layer. The entropy encoder 640 may encode coefficients in which the coefficient of a discrete layer is zero, that is, refinement coefficients, without loss. At this time, the entropy encoder 640 may be provided refinement coefficients included in the unit area from the quantization unit 630.

Figure 10:
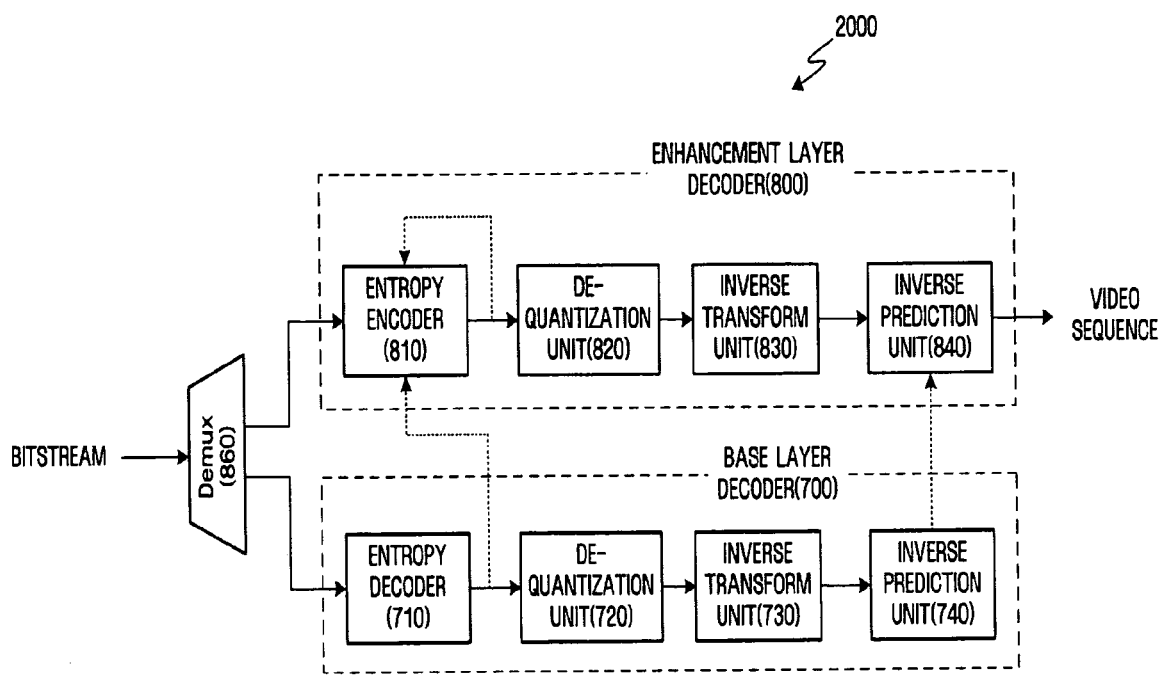
FIG. 10 is a block diagram illustrating the structure of a multilayer-based video decoder, which an entropy decoder may be applied to, as shown in FIG. 5 or FIG. 8.

FIG. 10 is a block diagram illustrating the structure of a multilayer-based video decoder 2000 which may be applied to the entropy decoder, as shown in FIG. 5 or FIG. 8.

An input bitstream may be divided into an enhancement layer bitstream and a base layer bitstream through a Demux 860, and may be provided to an enhancement layer encoder 800 and a base layer decoder 700, respectively.

An entropy decoder 810 may restore a quantization coefficient by decoding without loss in a way that corresponds to the entropy encoder 640.

An inverse quantization unit 820 may de-quantize the restored quantization coefficient to a quantization step used in a quantization unit 630.

An inverse transform unit 830 may inversely transform the de-quantized results by using inverse spatial transform techniques such as the inverse DCT transform or the inverse wavelet transform.

An inverse prediction unit 840 may obtain a prediction image from the prediction unit in the same way, and may restore the video sequence by adding the inversely transformed result to the obtained prediction image.

As in the case of the enhancement layer decoder 800, a base layer decoder may also include an entropy decoder 710, an inverse quantization unit 720, an inverse transform unit 730, and an inverse prediction unit 740 having the same functions.

The entropy decoder 810 may include the CAVLC decoder 200 of FIG. 5 or the refinement coefficient decoder 400 of FIG. 8. If the entropy decoder 810 is a CAVLC decoder 200, a lookup table may be selected based on the number of non-zeros among quantization coefficients of a base block provided from an entropy decoder 710 of a base layer decoder 700, and a CAVLC decoding process such as Num_Trail, and others may be executed according the selected lookup table.

In the case where the entropy decoder is operated as a refinement layer decoder 400, the base layer corresponds to a discrete layer, and the enhancement layer corresponds to an FGS layer. The entropy decoder 810 may encode coefficients, in which the coefficient of a discrete layer is zero, that is, refinement coefficients, without loss. At this time, the entropy decoder 810 may use refinement coefficients included in the entropy-decoded unit area.

Each element in FIG. 2 through FIG. 6 may be implemented as software such as tasks, classes, sub-routines, processes, objects, execution threads, and programs, or hardware such as a Field-Programmable Gate Array (FPGA) or an ASIC (Application-Specific Integrated Circuit), and may also be implemented as a combination of software and the hardware. The elements may be included in storage media which is readable by a computer, or may be distributed in a plurality of computers.

The above described exemplary embodiments are for purposes of illustration only, and are not to be construed as a limitation of the invention. The scope of the invention is given by the appended claims, rather than the preceding description, and all variations and equivalents which fall within the range of the claims are intended to be embraced therein.

According to the structure of the present invention, the performance of an entropy coding in a multilayer-based video codec can be improved, thereby providing an improved video image quality.

What is claimed is:

1. An entropy coding method that codes a first coefficient without loss, which is included in a block of a predetermined layer among coefficients generated by coding a multilayer video, the method comprising:
    (a) obtaining a distribution of a second coefficient, which is included within an area of a base layer corresponding to the block;
    (b) selecting a lookup table appropriate for the distribution among a plurality of lookup tables; and
    (c) transforming the first coefficient into a value mapped to the selected lookup table,
    wherein the distribution is obtained by one of a total number of zeros and a number of non-zero coefficients among the second coefficients.

2. The method of claim 1, wherein the generated coefficients are quantization coefficients generated after passing through a quantization process.

3. The method of claim 1, wherein the block is one of a 4×4 grid of pixels and an 8×8 grid of pixels.

4. The method of claim 1, wherein the distribution is obtained by one of a number of zeros and a number of non-zero coefficients among the second coefficients.

5. The method of claim 4, wherein (b) is performed by selecting a lookup table, in which, if the number of zeros is large, a relatively short mapping code is allocated to a small coefficient, and if the number of zeros is small, a relatively short length mapping code is allocated to a large coefficient.

6. The method of claim 1, wherein (b) includes:
    (b1) counting a number of non-zero coefficients of the first and second coefficients;
    (b2) counting a number of non-zero coefficients of a third coefficient of a neighboring block of the same layer as the block;
    (b3) obtaining representative values of the counted number in (b1) and the counted number in (b2); and
    (b4) selecting the appropriate lookup table according to the representative values.

7. The method of claim 6, wherein the neighboring block is at least one of the upper neighboring block and the left neighboring block.

8. The method of claim 6, wherein the representative value is obtained by a weighted average of the count of (b1) and the count of (b2).

9. The method of claim 1, wherein the entropy coding method includes a context-adaptive variable length coding.

10. An entropy decoding method that restores a first coefficient on a block of a layer by decoding a first bitstream of a predetermined layer among inputted bitstreams without loss, the method comprising:
    (a) restoring a second coefficient included in an area of a base layer corresponding to the block;
    (b) obtaining a distribution of the restored second coefficient;
    (c) selecting an appropriate lookup table for the distribution among a plurality of lookup tables; and
    (d) transforming the first bitstream into the first coefficient based on the selected lookup table,
    wherein the distribution is obtained by one of a total number of zeros and a number of non-zero coefficients among the second coefficients.

11. The method of claim 10, wherein the first and second coefficients are quantization coefficients.

12. The method of claim 10, wherein the block is one of a 4×4 grid of pixels and an 8×8 grid of pixels.

13. The method of claim 10, wherein the distribution is obtained by one of a number of zeros and a number of non-zero coefficients among the restored second coefficients.

14. The method of claim 13, wherein (c) is performed by selecting a lookup table, in which, if the number of zeros is large, a relatively short mapping code is allocated to a small coefficient, and if the number of zeros is small, a relatively short mapping code is allocated to a big coefficient.

15. The method of claim 10, wherein (c) includes:
    (c1) counting the number of non-zero coefficients of the first and second coefficients;
    (c2) counting a number of non-zero coefficients of a third coefficient of a neighboring block of the same layer as the block;

(c3) obtaining representative values of the count of (c1) and the count of (c2); and (c4) selecting the appropriate lookup table according the representative values.

16. The method of claim 15, wherein the neighboring block is at least one of the upper neighboring block and the left neighboring block.

17. The method of claim 15, wherein the representative value is obtained by a weighted average of the count of (c1) and the count of (c2).

18. The method of claim 10, wherein the entropy coding is context-adaptive variable length coding.

19. An entropy decoding device that restores a first coefficient of a block of a layer by decoding a first bitstream of a predetermined layer among inputted bitstreams without loss, the method comprising, means for restoring a second coefficient included in an area of a base layer corresponding to the block;

means for obtaining a distribution of the restored second coefficient;

means for selecting a lookup table appropriate for the distribution among a plurality of lookup tables; and means for transforming the first bitstream into the first coefficient, based on the selected lookup table, wherein the distribution is obtained by one of a total number of zeros and a number of non-zero coefficients among the second coefficients.

* * * * *